United States Patent [19]

Nicolas

[11] 3,723,901

[45] Mar. 27, 1973

[54] ELECTRONIC CONTROL DEVICE WITH CONDITION RESPONSIVE OSCILLATOR

[75] Inventor: Jean Pierre Nicolas, Nice, France

[73] Assignee: Adolf Feller Aktiengesellschaft, Horgen, Switzerland

[22] Filed: Feb. 3, 1971

[21] Appl. No.: 112,171

[30] Foreign Application Priority Data

Feb. 3, 1970 France....................7003759
Jan. 4, 1971 France....................7100026

[52] U.S. Cl.....................331/65, 307/116, 317/146, 331/117 R, 340/258 C, 340/279

[51] Int. Cl.....................H01h 47/32, H03b 5/12

[58] Field of Search.....331/65, 117 R; 307/116, 125, 307/308; 317/146; 328/5; 340/258 C, 279

[56] References Cited

UNITED STATES PATENTS

| | | | |
|---|---|---|---|
| 3,171,066 | 2/1965 | Atkins et al. | 331/65 X |
| 3,246,257 | 4/1966 | Evalds et al. | 331/65 X |
| 3,621,307 | 11/1971 | Raven et al. | 331/65 X |

*Primary Examiner*—Roy Lake
*Assistant Examiner*—Siegfried H. Grimm
*Attorney*—Breitenfeld & Levine

[57] ABSTRACT

An electronic device intended to supply an electric control signal in response to the momentary application of an impedance which may be constituted by the impedance of the human body between an input terminal and earth. The device comprising a single active amplifier element in a feedback oscillator in which the feedback circuit is completed, for example, by being touched. The active member is biased in class C so that it is virtually blocked until oscillations set in by closing the feedback circuit with the human body whereupon the active element passes into class A condition. The control signal is formed by the average current of the active member resulting from amplification of the detected oscillations on the input electrode of the active element. This single amplifier stage produces simultaneously a feedback of the high frequency current, a detection of the peaks of this high frequency current and an amplification in direct current of the detected current, the state of oscillation continuing or not, according to a chosen mode of operation after the said impedence is no longer applied.

11 Claims, 16 Drawing Figures

INVENTOR:
JEAN PIERRE NICOLAS
By
Breitenfeld & Levine
ATTORNEYS

ELECTRONIC CONTROL DEVICE WITH CONDITION RESPONSIVE OSCILLATOR

The present invention relates to an electronic control device of the type supplying an electric control signal adequate for actuating a relay, in response to the application of an impedance which may be constituted by the impedance of the human body, between an input terminal for starting and earth.

Devices of this type are already known which use an oscillator stage, whose operating conditions are modified when such an impedance is applied the resultant charge being used via an auxiliary amplifier stage to provide an electric control signal.

According to the desired function, this auxiliary amplifier stage may be constructed so as to respond directly to the application of the aforesaid impedance, that is to say, it assumes a first state, when the said impedance is applied and, a second state, when it is not applied; or alternatively it may have a bistable operation, that is to say it may change its state each time the aforesaid impedance is applied for example to an oscillatory stage.

In the prior art arrangements it is thus necessary to use an auxiliary amplifier stage to provide an electric control signal of sufficient amplitude to ensure, for example, the operation of a relay. The addition of an auxiliary amplifier stage has the effect of increasing the electrical consumption of the arrangement, and increasing its complexity, which also leads to an increase in its size and its cost.

Another important, specific parameter of such a device is its operating sensitivity, i.e., the minimum variation of impedance which, when applied makes it possible to obtain a control signal. For known devices, the variations of the operating conditions of an oscillatory stage are not great since the system is subject to the application of a smaller variation of impedance.

A first object of the present invention is to provide an electronic device of this type, constituted by a single active element and which supplies an adequate electrical signal for the control of a relay, whilst offering excellent sensitivity and low consumption when at rest.

Another object of the present invention is to provide such a device which is suitable for bistable operation obtained by means of the single, active amplifier element.

Another object of the present invention is to provide control devices able to replace the switches or push-buttons in electrical installations, in particular for setting up the oscillation system. According to a preferred embodiment, these control devices are supplied with direct voltage derived from the alternating mains.

Another object of the present invention is to provide a device of the latter type in which the direct supply is provided by the alternating mains, and for which the control impedance is applied, via the lines of the alternating mains supply, between the input terminal and the earth.

The device according to the invention is characterized in that it comprises a single active amplifier element connected as a feedback oscillator, comprising an open feedback circuit ending in the said input terminal for operation, the active member being biased in Class C in such a way that it is virtually blocked in the absence of oscillations when the feedback circuit is open, the application of the said impedance between the operating terminal and the earth closing the feedback circuit such that the oscillator begins to oscillate and causes the active member to pass into a conduction state, substantially in Class A, the control signal being formed by the average current supplied by the active member, obtained by amplification of the component of direct current due to the detection of the oscillations on the input electrode of the active element, this single amplifier stage producing simultaneously a feedback in the high frequency current, a detection of the peaks of this high frequency current and an amplification in direct current of the detected current, this state of oscillation continuing or not, according to the chosen mode of operation, after the said impedance is no longer applied.

Other features and advantages of the invention will become apparent on reading the following detailed description, referring to the accompanying drawings, given as non-limiting examples and in which:

FIG. 1 shows the electrical diagram of a first embodiment of the device of the invention, and in which the oscillator is a Hartley oscillator and the feedback rate is adjusted by means of a resistance $r_a$ connected in parallel with the coil connected to the input operating terminal;

FIGS. 1*a* and 1*b* show variations of the assembly of FIG. 1 in which the said resistance $r_a$ is connected in series with the said coil;

Figure 1:
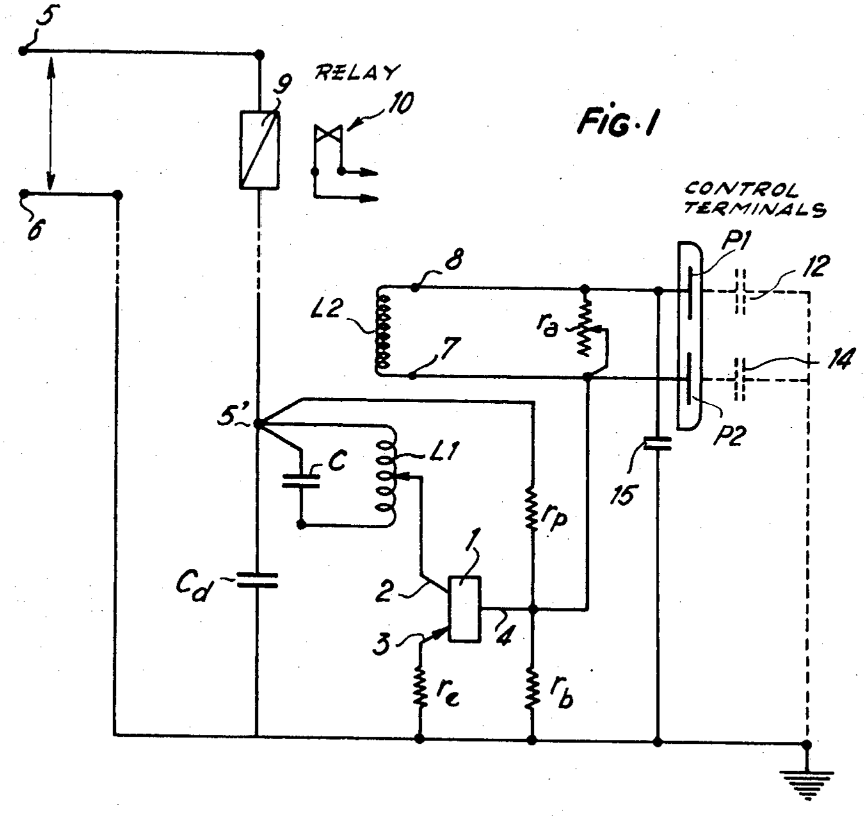

The device of FIG. 1 is a transistorized Hartley oscillator. The oscillator is formed of a transistor 1 constituting an active member and a feedback circuit. The transistor 1 comprises a collector 2, an emitter 3 and a base 4. The supply voltage of the transistor is applied between the terminals 5 and 6. The base 4 of the transistor is biased by a potential divider formed by the resistances $r_p$ and $r_b$. A resistance $r_e$ is inserted in the emitter circuit.

The feedback circuit is composed of an oscillatory circuit, inserted in the collector circuit and constituted by a coil L1 and a condenser C and coupled to a feedback coil L2. A first end 7 of the coil L2 is connected to the base 4 whilst the second end 8 is connected to a first input terminal or electrode P1, a so-called operating or starting terminal. The first end 7 of the coil L2 is also connected to a second input terminal, or electrode P2, a so-called stopping terminal. These two terminals are conductors and are possibly covered with an insulating coating, for example of synthetic material.

An adjustable resistance $r_a$ is connected in parallel with the coil L2.

A decoupling condenser Cd is connected in parallel with the supply terminals 5 and 6.

The coil 9 of an electromagnetic relay is connected in series in the supply to the collector of the transistor, the contacts of this relay being shown at 10.

Figures 2A, 2B:
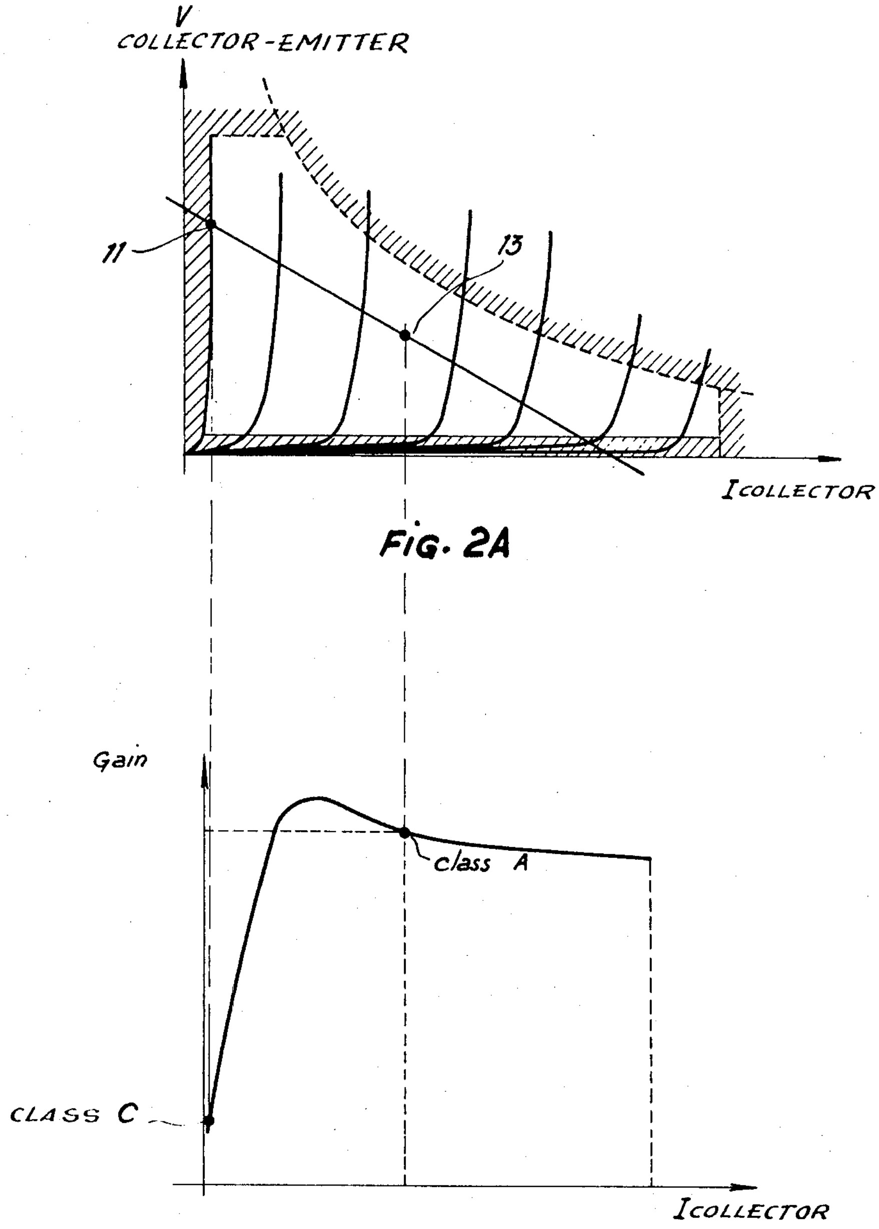
FIGS. 2A and 2B are diagrams representing the operation of the active element of the devices according to the invention.

The operation of the device is as follows:

At rest, the transistor is biased by means of the divider $r_p$, $r_b$, so as to be virtually blocked (operation in class C). The current absorbed by the transistor is thus very low but not zero, the relay is not excited and the oscillator does not oscillate due to the fact that the feedback circuit is not closed. This is a first stable state. The operating point may be shown at 11 on FIGS. 2A and 2B.

When the terminal P1 is touched, the feedback circuit closes due to the impedance of the human body, the oscillator begins to oscillate and the transistor becomes unblocked in order to operate substantially in class A. It thus passes a considerable current through the coil 9 and the relay is excited. In fact, the action of touching the terminal P1 creates a series capacitor 12 which closes the feedback circuit. The oscillator begins to oscillate, but the base current increases very quickly due to the detection by the base of the crest voltages of the circuit L2. The result is a corresponding increase of the collector current which is more considerable the greater the gain and the transistor passes to Class A operation (point 13 of FIGS. 2A and 2B). The increase in the amplitude of the oscillations is thus limited by the damping of the oscillatory circuit due to the detection of the oscillation peaks. The increase in gain of the transistor favors not only the rapid increase of the current used but also the bistable operation described hereafter.

According to a first method of operation, when the hand is removed from the terminal P1, the device continues to oscillate, such that it is in a second stable state. The stray capacitances 15 closing the feedback circuit are enough to maintain the oscillation, when the transistor operates in Class A with its normal gain, its retention in this class of operation being ensured by the initial biasing of the base, modified by the detection of the peaks of voltage oscillation of the feedback circuit.

Naturally the stray capacitances 15 may be partially constituted by a condenser connected between the terminal P1 and earth.

When it is desired to suppress the oscillations and therefore suppress the excitation of the relay 9, 10, a capacitance 14 is introduced between the terminal P2 and earth, which short-circuits the input of the transistor; this control may be ensured either by the momentary application of the hand on the second terminal P2, or by an electrical control of independent electronics which causes an equivalent action. The transistor thus operates once more in Class C, i.e., in its first stable state. When the hand is removed from the plate 2, the device remains in the state of non-oscillation, since the coefficient of amplification is too small for the system to oscillate with only the stray capacitances 15, with an amplitude such that the bias may be modified as in the other state.

The current absorbed by the transistor assumes two different values in the two stable states and constitutes a control signal. In this case, this control signal is used to excite the coil of an electromagnetic relay, but it is clear that this signal may be used in any way desired, namely for remote control. One may thus replace the coil by a resistance and use the voltage developed across it to control a member at a distance.

As has already been stated, the resistance $r_b$, in combination with the resistance $r_p$, makes it possible to adjust the bias point of the transistor to class C and thus the current absorbed by the oscillator in the state of rest. In addition, when the transistor is virtually blocked, it contributes to forming the input impedance of the assembly, and it thus has an effect on the sensitivity of action on the terminals P1 and/or P2.

Figure 1A:
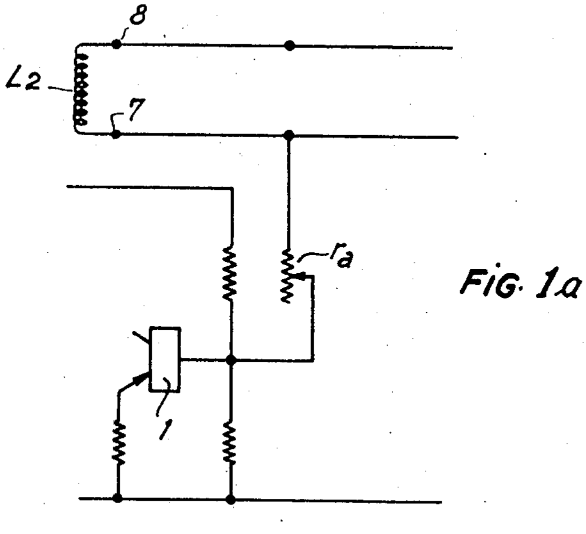
Figure 1B:
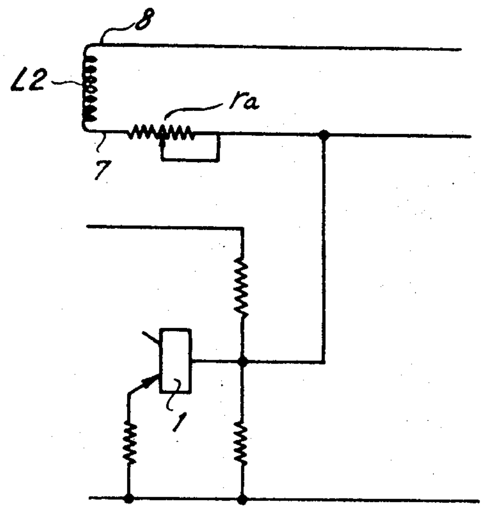

The resistance $r_a$ serves to regulate the feedback. This regulation may also be effected by placing the resistance $r_a$ in series in the feedback circuit (FIGS. 1*a* and 1*b*).

For the embodiment of FIG. 1, if the resistance $r_a$ starts at a low value and is then progressively increased, all other things being equal, it is possible to obtain the following different situations:

a. the oscillations exist only during the time in which the terminal P1 is touched;
b. the operation is bistable (as indicated above, the sensitivity of the terminal P1 being greater than that of the terminal P2;
c. the operation is bistable and the sensitivity of the two terminals P1 and P2 is counterbalanced;
d. the operation is bistable and the sensitivity of the terminal P1 is less than that of the terminal P2;
e. the oscillations exist permanently, except during the period of touching the terminal P2.

This method of adjustment of the feedback by means of a resistance $r_a$ which produces a damping of the feedback circuit makes it possible to obtain, by means of a single adjustable resistance, the various methods of operation specified above.

Nevertheless, the damping of the feedback circuit has the two following consequences:

in order to maintain a sufficiently high value of the feedback, it is necessary that the coupling coefficient of the coils L1 and L2 is high; the result is that the stray capacitance 15 between these coils represented as connected to point 8 of FIG. 1 is also quite high, this capacitance 15 helping towards the bistable operation.

due to the damping and the high coupling, the oscillation frequency of the device varies mainly in dependence on the external conditions and in particular on the supply voltage.

In fact, the use of the device is linked to the two specific variables, the control signal and the sensitivity. The electric control signal (average collector current of the transistor in the presence of oscillations) is higher, the greater the feedback. As regards the sensitivity of the terminals, it is greatest when the assembly begins to oscillate for a smaller variation of the input impedance. The latter corresponds to the application of a high control impedance or a low capacitance in the case where the terminal P1 is covered with an insulator.

Figure 3:
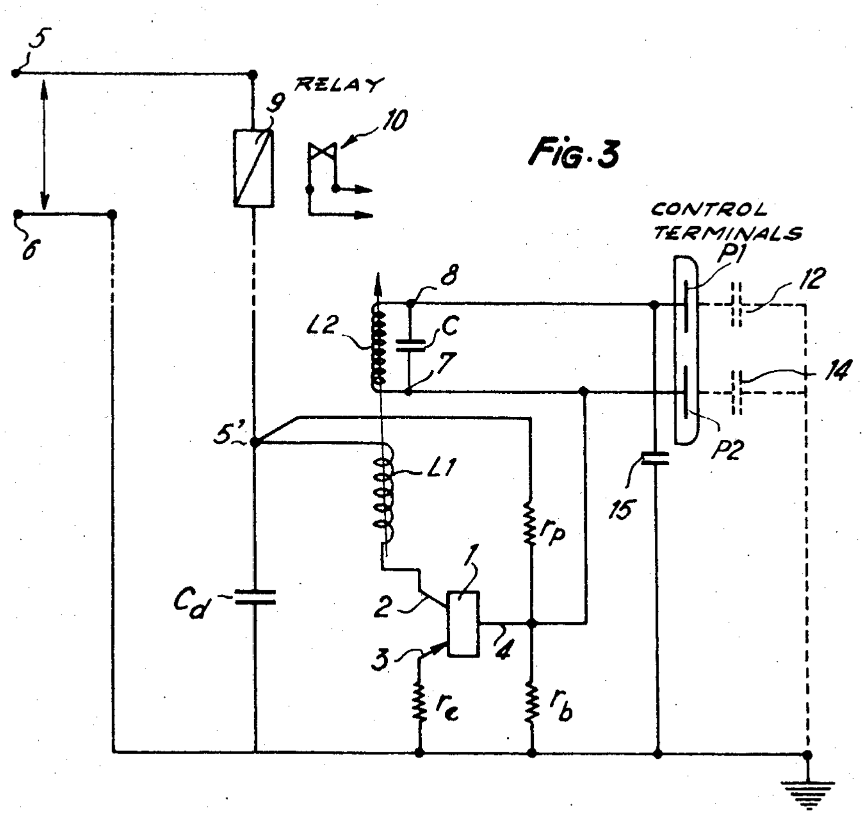
FIG. 3 shows the electrical diagram of a preferred embodiment of the device according to the invention, in which the oscillator is a tuned-grid oscillator and the feedback rate is adjusted by variation of the coupling between two coils.

A preferred embodiment is shown in FIG. 3, which has both better sensitivity and a stronger control signal in a state of oscillation. This preferred embodiment differs from the embodiment of FIG. 1 solely by the type of oscillator arrangement which is of the tuned-base type, the condenser C being connected in parallel with the coil L2, in that the regulation of the feedback is made by modification of the coupling of the coils L1 and L2, the resistance $r_a$ being removed, and in that the capacitance 15 is essentially constituted by a condenser of chosen value according to the method of operation desired, the stray capacitances being very low.

The tuned-grid type assembly avoids the need to provide a tapping on the coil in the collector circuit of the transistor and allows better stability of the oscillation frequency. Moreover, the regulation of the feedback by variation of the coupling between the two coils, avoids damping of the circuit, and by this means also provides better stability of the oscillation frequency.

In addition, since the stray capacitance 15 is very reduced the device does not tend readily to produce a bistable operation. This bistable operation is obtained by the insertion of a condenser 15 of appropriate value. There will be described hereafter, with reference to FIG. 4, a device similar to that of FIG. 3, but which does not have the bistable operation and also has no condenser 15.

There will now be described the variometer shown in FIGS. 3A and 3B. This variometer has been developed by the applicant such that the two coils have a minimum stray capacitance of coupling at the same time as a great range of adjustment of the inductive coupling. This variometer is moreover of considered dimensions for being inserted in a printed circuit, the illustrations of FIGS. 3A and 3B being on a considerably enlarged scale.

Figure 3A:
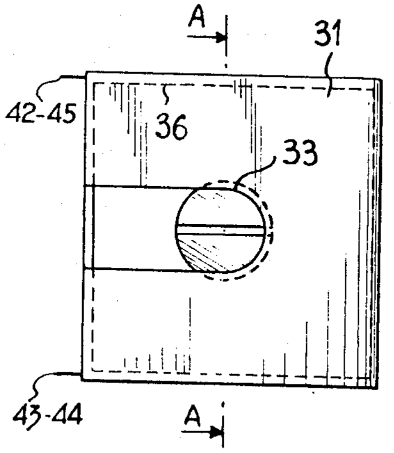
FIGS. 3A and 3B are respectively an elevation and a longitudinal sectional view of a variometer used preferably to obtain the said variation of the connection of two coils intended to adjust the feedback rate.
Figure 3B:
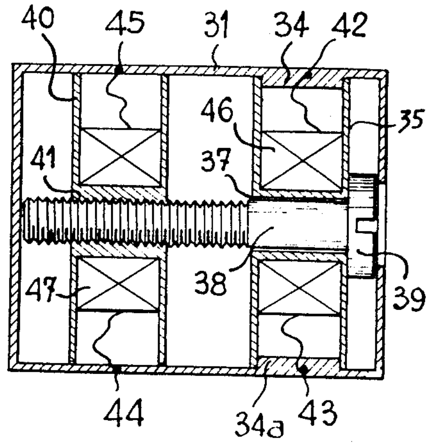

It is provided with an outer casing or "base" 31 (FIG. 3A). This casing 31 has an appropriate cut-out in order to form an aperture with a substantially semi-circular end 33. The casing 31 has two shoulders 34 and 34A capable of retaining a stationary coil 35 in a chosen position near the aperture 33. This coil 35 has a square outer shape 36 visible in FIG. 3A. It is, on the other hand, provided with a central, cylindrical hole 37 which appears opposite the aperture 33. A plastic screw 38 with a slotted head 39 passes through the hole 37 of the coil 35 and is arranged in such a way that the slot of head 39 appears in the aperture 33. The length of the screw is such that it occupies all the longitudinal dimension of the casing 31 of the variometer. A movable coil 40, similar to the coil 35, apart from its central hole 41, which is threaded, is movable inside the casing 31. The thread of the central hole 41 co-operates with the thread of the screw 38. The casing 31 is provided with four conducting segments 42, 43, 44 and 45 which are connected respectively to the two ends of the windings 46 and 47 wound respectively on the coils 35 and 40. The wires for connecting the winding 47 to the segments 44 and 45 are chosen so as to allow movement of the coil 40.

The variometer thus described is of very simple design and is very easy to mount. Firstly, the coil formers of 35 and 40 are made and the windings 46 and 47 are wound. The screw 38 is passed into the coil 35 and this screw engages the thread 41 of the coil 40. The assembly thus obtained is then secured in the base 31 such that the stationary coil 35 is immobilized by the shoulder of the casing 31, and in such a way that the head of the screw appears in the aperture 33. The outlet wires of the coils are soldered to the segments 42 and 45, and the assembly is secured to a printed circuit by means of the said segments.

The inductive coupling between the windings 46 and 47 is varied between wide limits controlled externally by screw 38. The forms of coils 35 and 40 are made, for example, of insulating material. The casing composed of the casing 31 is of insulating material preferably plastics material.

The variometer thus produced, may have no other conducting materials than the winding and the segments so that stray capacitance is thus very low. As has been mentioned above, this variometer much improves the operation of the device according to the invention, and facilitates its use on a large scale in control devices.

Figure 4:
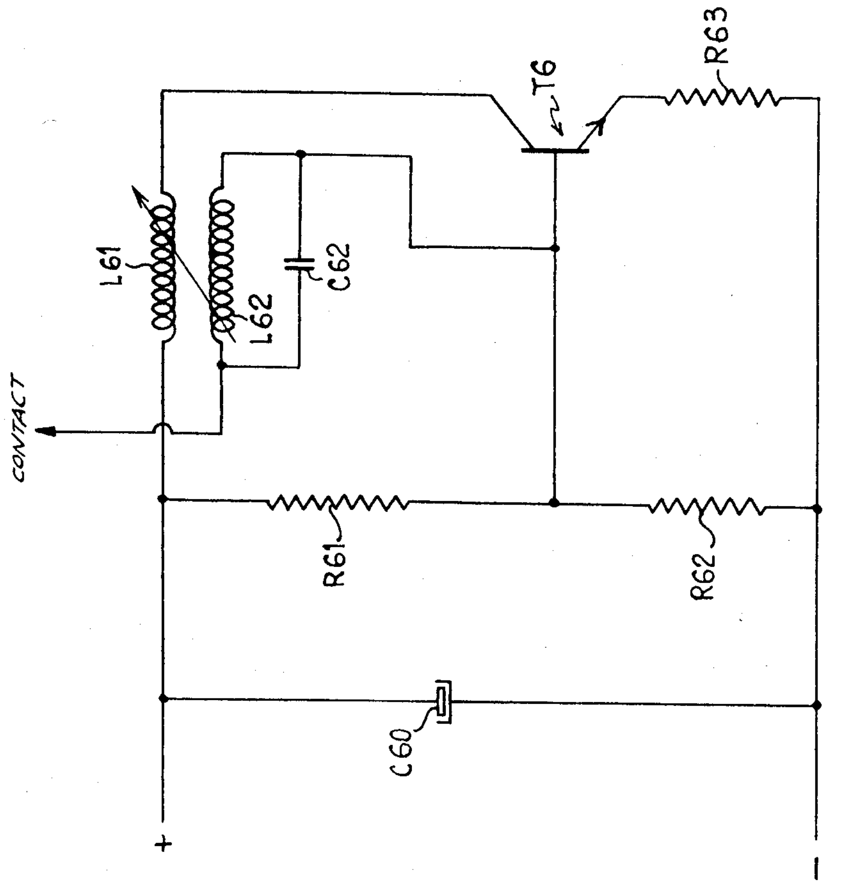
FIG. 4 shows the electrical diagram of the variation of FIG. 3, made so as to obtain a monostable operation in direct response to the application of an impedance at an operating input terminal.

FIG. 4 shows the electrical diagram of the device according to the invention in an embodiment which is not bistable but is derived from that of FIG. 3. This embodiment will be called an electronic contact in the remainder of the present description, with a view to simplification, and when there is added to it a relay through which there passes the control signal, it will be called an electronic contact with relay. Moreover, the aforesaid, non-bistable operation will conventionally be called monostable. Between the + and − supply terminals there is provided a condenser C60 which insures the de-coupling of the electronic contact, as well as two resistances R61 and R62 which constitute the bias circuit for the base of a transistor T6. In the emitter of this transistor T6 there is located a resistance R63. In the collector of the transistor T6 a winding L61 is arranged. On the other hand, a tuned circuit constituted by means of a winding L62 and parallel condenser C62 is provided between the base of the transistor T6 and the terminal for operating the electronic contact or "-contact" terminal. The windings L61 and L62 are, preferably, coupled in order to form a variometer such as that shown in FIGS. 3A and 3B.

The operation of the device is thus as follows:

when an impedance is applied between the "contact" terminal and earth, the voltage present at the terminal of the tuned circuit is returned between the base of the transistor T6 and earth. The system rapidly begins to oscillate.

These oscillations stop as soon as the impedance is no longer applied. Indeed the weak stray capacitance of the coupling of the variometer according to the modifications does not enable the oscillations to be maintained in the case of the arrangement of FIG. 6. This arrangement is thus monostable.

There will now be described the remote control devices shown in FIGS. 5 to 7. On these figures a certain number of common references are used: S1 and S2 for the lines of the alternating mains, CT for a control winding of a remote control-circuit-breaker capable of controlling the change of state of a power device when a control signal in the form of an impulse is applied to it, TE for the electronic contact of FIG. 4, now considered as a block, and connected to a relay R.

Figure 5:
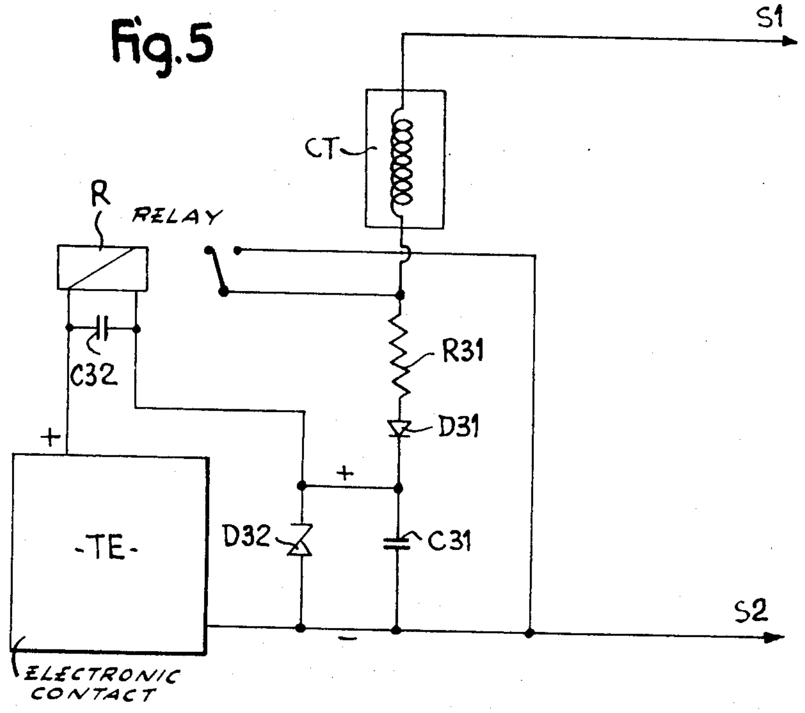
FIG. 5 shows a first electrical arrangement for the intermittent operation of a remote-control circuit-breaker in response to the control signal produced by a device according to the invention such as that of FIG. 4, the direct supply of which is ensured by half wave rectification.

On FIG. 5 there are provided, in series between the line S1 and the line S2 of the mains, a control winding CT of the remote control contact-breaker, a resistance R31, a diode D31 and a condenser C31. The current passing through these members arranged in series is half-wave rectified by means of the diode D31 and the condenser C31. The load voltage of the condenser C31 is limited by a Zener diode D32 arranged in parallel with the condenser C31. The supply voltage of the electronic contact TE is taken from the terminals of the Zener diode D32.

The movable contact of the relay R is arranged in such a way that when the relay is in an energized condition the series assembly constituted by the resistance R31, the diode D31 and the condenser C31 is short circuited. The control winding CT is thus directly connected to the two lines of the alternating mains. It is thus excited when the relay R, controlled by the electronic contact, passes into the energized state, which thus operates in a monostable circuit.

In this case, any action on the electronic contact produces, through the intermediary of the relay R, the passage of a control current into the winding CT, this control current stopping as soon as the action on the electronic contact TE is interrupted. Since the winding CT is sensitive to an impulse, the control of the change of state of the power device is thus assured.

For the arrangement of FIG. 5, when the relay R is actuated, the supply to the electronic contact is provided by the load voltage of the condenser C31. Since the consumption is clearly greater when the relay R is actuated, the condenser C31 discharges rapidly, which causes the return of the movable contact of the relay R to its rest position. If during this time, the action on the electronic contact is maintained, then as soon as the condenser C31 is sufficiently recharged, the relay R returns to the energized condition.

The arrangement shown in FIG. 5 in fact gives an intermittent control to the winding CT during any action on the electronic contact TE. The duration of this intermittent operation may be modified by means of a condenser C32 connected in parallel with the supply terminals of the relay R.

Naturally such a flashing device may be used with all types of winding CT. The winding CT may even be replaced by a circuit using low power such as a flashing lamp.

It will be noted that the system illustrated in FIG. 5 has two components capable of a relative large consumption of current. These components are the winding CT and the relay R. According to the arrangement these two components cannot operate simultaneously.

The devices shown in FIGS. 6 and 7, which will now be described, are mounted in such a way that the two components with high current consumptions may operate simultaneously. They do not operate intermittently, and they are only capable of producing a change of state when there is some action on the electronic contact.

Figure 6:
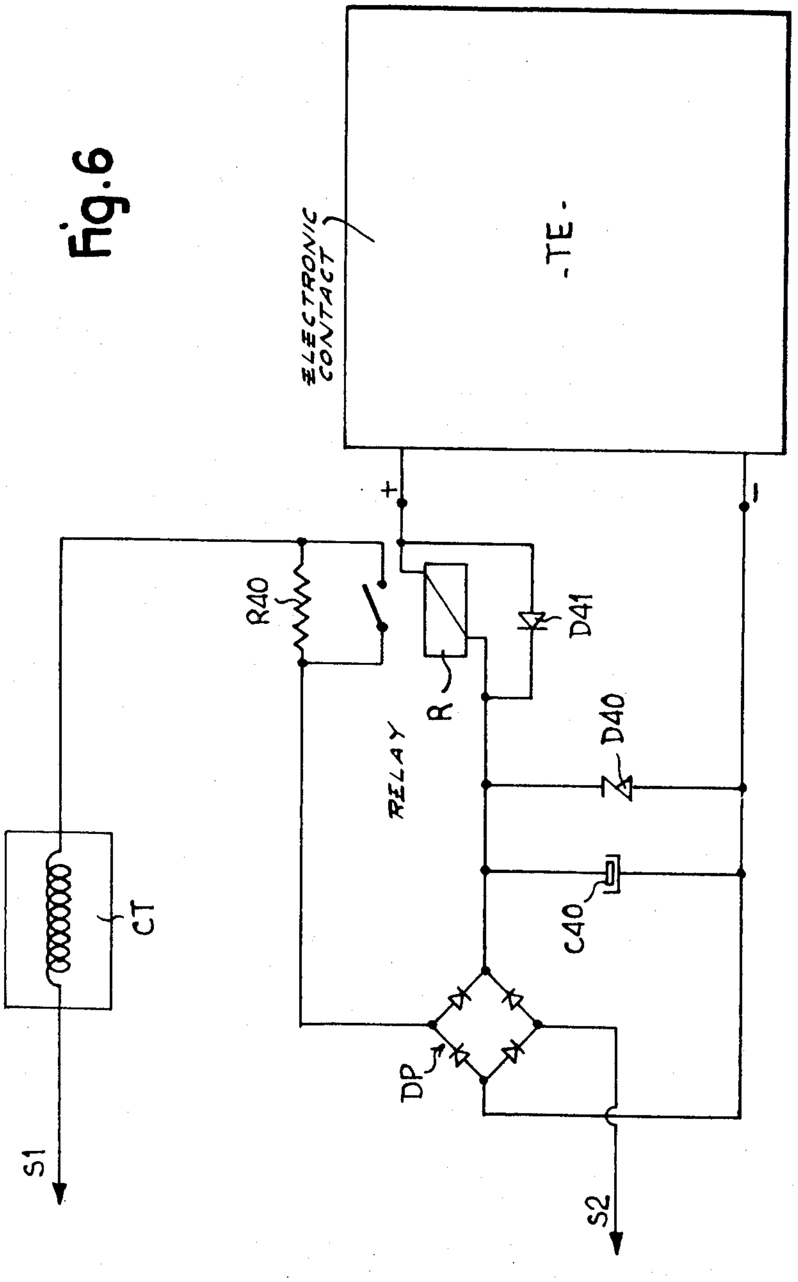
FIG. 6 shows a second electrical arrangement for the operation of a remote-control circuit-breaker in response to the control signal provided by a device according to the invention like that of FIG. 4, the electrical supply of which is ensured by rectification by means of four bridge diodes.

In FIG. 6 there is shown a device constituted in series by a control winding CT, a resistance R40 and a bridge of four diodes DP, and arranged between the lines S1 and S2 of the alternating mains supply. The two output terminals of the diode bridge DP are connected to a parallel arrangement constituted by a condenser C40 and a Zener diode D40. This arrangement provides the supply voltage for a relay R connected in series with the electronic contact TE. A diode D41 is arranged in the direction of inverse conduction between the terminals of the relay R, so as to avoid, in manner known per se, inverse overvoltages in this relay.

When it is in the operating position, the movable contact of the relay R short-circuits the resistance R40. The device thus has two different states:

in the absence of some action on the electronic contact TE, a current passes through the winding CT, the resistance R40, and the diode bridge DP in which it is rectified, which permits the charging of the condenser C40. The load voltage of the condenser C40, limited by the Zener diode D40, serves for the supply of the electronic contact TE and of the associated relay R. The current passing through the winding CT, limited by the resistance R40, is weak, and this winding CT does not provide a control signal. Since the relay R is not in an energized condition, its consumption is low. The voltage rectified by the diode bridge is sufficient to supply the electronic contact TE and its relay R.

when there is some action on the electronic contact TE, the resistance R40 is short-circuited, and the current passing through the winding varies very rapidly, which produces the control of a power device. This strong current also passes through the diode bridge where it is rectified, to ensure at the terminals of the condenser C40, a sufficiently high voltage and a sufficiently strong current for supplying the electronic contact TE and the relay R in the energized condition.

The resistance R40 is chosen in such a way that the current passing through the winding CT, when the relay R is at rest, cannot provide a control signal, and in such a way as to limit the current passing through the Zener diode D40. Indeed, the consumption of the electronic contact in the absence of any action is very slight, and hardly any current is taken from condenser C40. It is thus when the relay R is at rest that the limitation of voltage due to the Zener diode D40 has the greatest significance.

The device illustrated in FIG. 6 is of very small size and is very simple to use, since it may be used particularly in place of any push-button which controls a winding of a remot control contact-breaker. Nevertheless, when the relay R is actuated, the yield of direct supply provided by the diode bridge DP, depends on the respective impedances of the winding CT and of the said relay R. These impedances may not be freely chosen since the winding CT is defined by the customary uses in electric installations and since the impedance of the relay R is chosen according to the features of the electronic contact TE.

Figure 7:
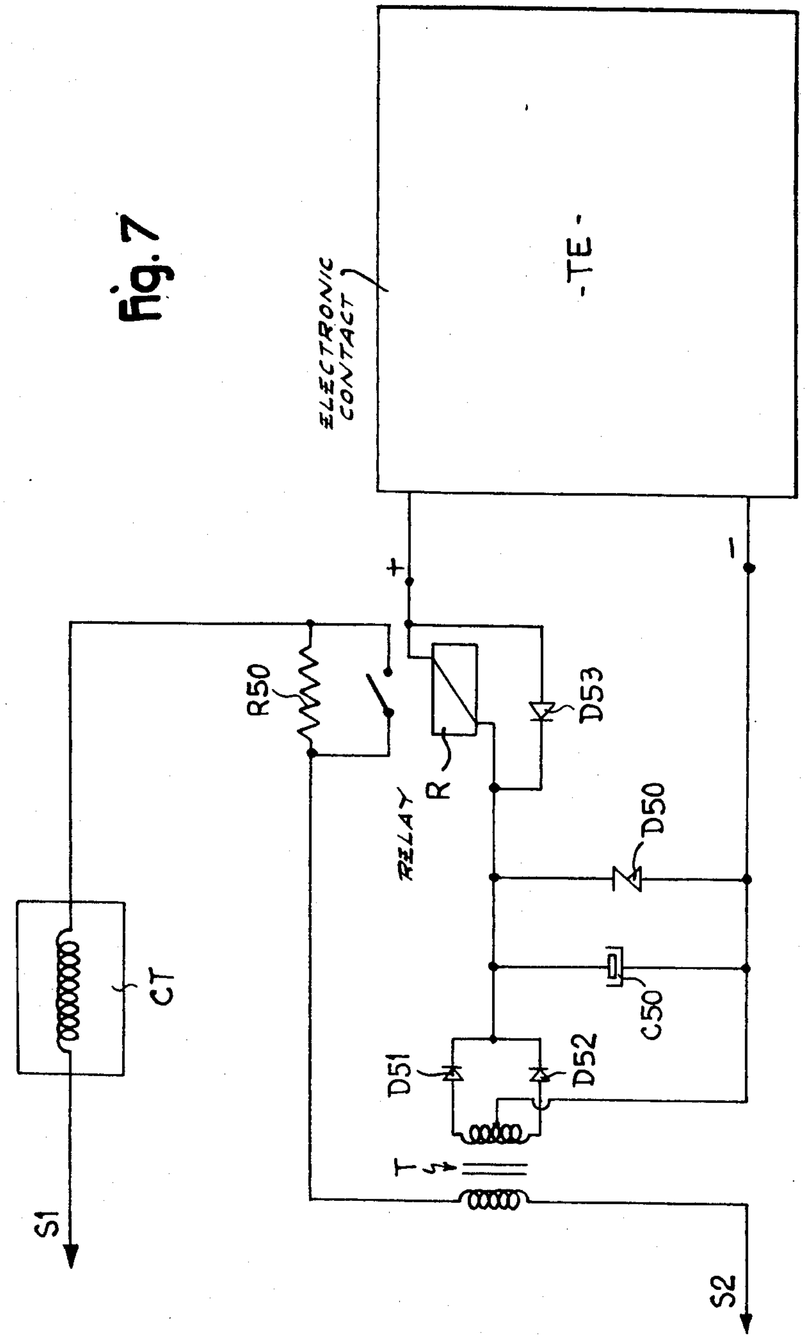
FIG. 7 shows a variation of the arrangement of FIG. 6 in which the electrical supply is ensured by full wave rectification by means of two diodes and a transformer.

The applicant has also produced a variation shown in FIG. 7 in which there is used a transformer T provided with a secondary winding having a center tapping and connected to two diodes D51 and D52 according to the well-known arrangement of full wave rectification. The primary winding of the transformer T is connected in series with a resistance R50 and a winding CT of a remote control circuit-breaker between the lines S1 and S2 of the alternating mains. The resistance R50 is short-circuited when the movable contact of a relay R is in the operated position. The other components of FIG. 7 are identical to those of FIG. 6.

The rectified voltage supplied by the diodes D51 and D52 is provided at the terminals of a condenser C50 and of a Zener diode D50. This rectified voltage feeds the relay R arranged in series with the electronic contact. A diode D53 mounted in reverse polarity across the terminals of the relay R absorbs the reverse overvoltages in this relay.

In this case, the applicant has used a transformer which makes possible the adaptation of the impedance in manner known per se. Such a transformer has the additional advantage of allowing a galvanic isolation of the electronic contact relative to the alternating mains. Such a transformer may be provided with the diode bridge of FIG. 6.

The operation of the device of FIG. 7 is identical to that of the device of FIG. 4, the use of the transformer simply allows a greater flexibility in the direct supply of the relay R and of the electronic contact TE, as well as the galvanic isolation of these two components, as described above.

The devices supplied by the mains which have just been described are controlled by the application of an impedance which is often that of a human hand on the contact terminal (arrangement of FIG. 4). This impedance in fact procures a variation of the closing impedance of the feedback circuit.

The control device according to the invention, and in particular by the use in FIG. 4 of a variometer is operated to give a change of state at the time of the application of a variation of the impedance at a point in its feedback loop. In most of the examples mentioned, the application of this variation of impedance has been described as due to the presence of a human body. Naturally, however, such a variation of impedance may be introduced in any manner whatsoever, for example by means of any type of conducting body other than a human being.

One variation of the invention consists in applying this impedance variation by means of the change of state of a resonant circuit tuned to a frequency close to the tuned frequency of the oscillator according to the invention, or equal to the latter.

This variation is of particularly interesting application. When this impedance variation is applied remotely via the conducting lines of the alternating mains, the oscillator according to the invention is supplied with a direct supply by means of the type described, for example in one of FIGS. 5 to 7.

Figure 8:
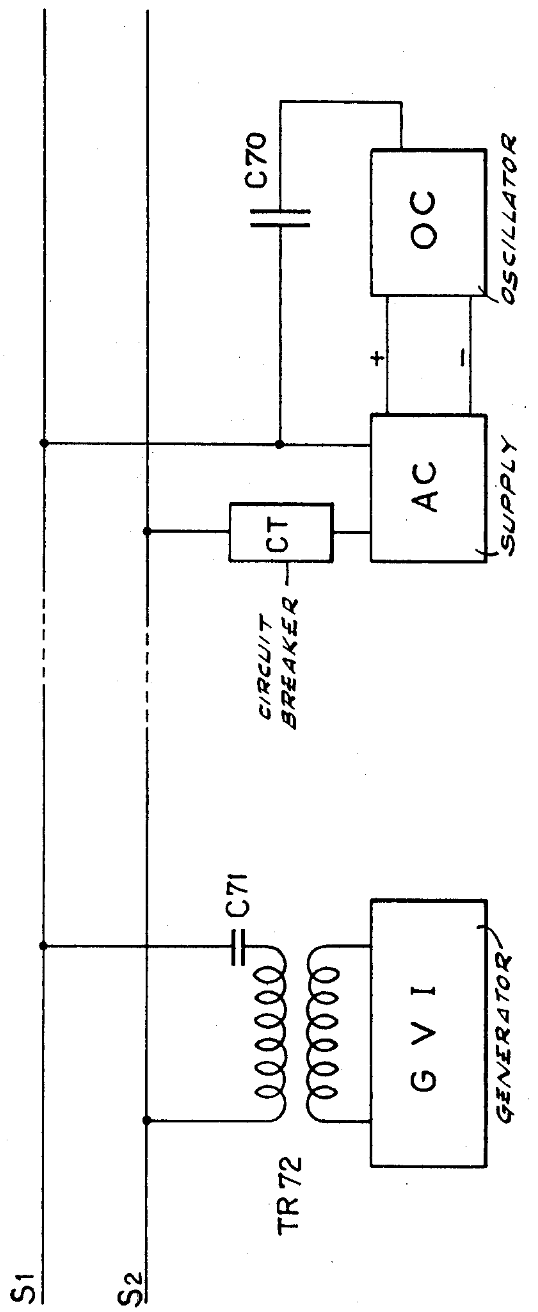
FIG. 8 is a diagram of the principle of an arrangement in which the impedance is applied at a distance to a device according to the invention, the transmission being made by at least one of the lines of the alternating mains.

Moreover, such an impedance variation of a resonant circuit is obtained very simply by means of a generator of a frequency near to the oscillation frequency of the oscillator according to the invention or equal to the latter. One preferred embodiment of this variation is described in FIG. 8. The mains wiring lines bear the references S1 and S2. In parallel on the mains lines there are arranged, on the one hand, an emitter of impedance variations intended to supply the control and, on the other hand, a control receiver.

The emitter comprises a generator GV1 of impedance variation which is advantageously an oscillator controlled by a frequency close to that of the oscillator according to the invention. A device of this type is known per se and may be easily made by a man skilled in the art. This oscillator is connected by a transformer TR72 and a condenser C71 to the two lines of the mains S1 and S2.

The application of the impedance variation for the control, i.e., in the example adopted, of the signal of this oscillator is thus made in parallel on the mains lines according to this embodiment. The condenser C71 and the transformer TR72 are chosen to bring about the matching of the impedance whilst eliminating almost totally the introduction of mains voltages at 50Hz in the generator GVI. The generator GVI is advantageously fed by the alternating mains in manner known per se.

The receiver comprises in parallel on the lines S1 and S2 a control winding for the remote control circuit breaker CT and a direct AC supply comprising the relay associated with the oscillator, for example, according to the embodiment of one of FIGS. 5 to 7. The oscillator OC connected to the outputs of the direct supply is preferably the arrangement of FIG. 4. The control terminal for the impedance variation, so-called contact terminal on FIG. 4 is connected via a condenser C70 to one of the mains lines (S1 in the case of FIG. 8). The value of the condenser C70 is chosen in such a way that the tripping of the oscillator is obtained correctly from a specific impedance variation known in a generator such as GVI (generally an oscillator), and taking into account the self-capacity of the lines of the alternating mains. The operating frequency of the oscillator OC may be of the order of 10 – 100 KHz. The tuned frequency (or oscillation frequency) of the generator GVI may be chosen in a range ± 2 KHz around the frequency of the oscillator OC.

This "remote line control" arrangement of an oscillator according to the invention is a particularly interesting improved variation of the invention for remote control in a place where the electrical supply is not transmitted via power transformers arranged in series, for example, in domestic areas.

It should be noted that neither the variometer nor the remote-control devices which have been described are specifically connected with an astable operation. In particular, it is very easy to provide two-wire remote control devices which by a combination of impedance variations due to two tuned circuits (preferably of an oscillator) make it possible to control the starting or stopping of the oscillator according to the invention.

In addition, the methods of direct supply are not limited by the examples given. For example, it is easy for a man skilled in the art to use the half-wave supply of FIG. 5 with a transformer in order to obtain a non-intermittent operation, as in FIG. 6.

The operation of such a remote control device by action on an electronic contact may thus be astable or bistable, that is to say that any action on the electronic contact gives rise to a change of state of the associated relay which may be limited to the duration of the application of the said action on a second contact terminal.

In the case of monostable operation with a single contact terminal, the remote control device with its direct supply and short-circuitable resistance is able to replace a push-button in an electrical installation supplied by alternating means. In addition, if the short-circuit used by the relay associated with the electronic contact is also applied to the direct supply, the device itself becomes intermittent.

In the case of bistable operation with two input terminals, the remote control device provided with a direct supply and a short-circuitable resistance is capable of replacing a two-state switch in an electrical installation supplied by the alternating mains.

Figure 9:
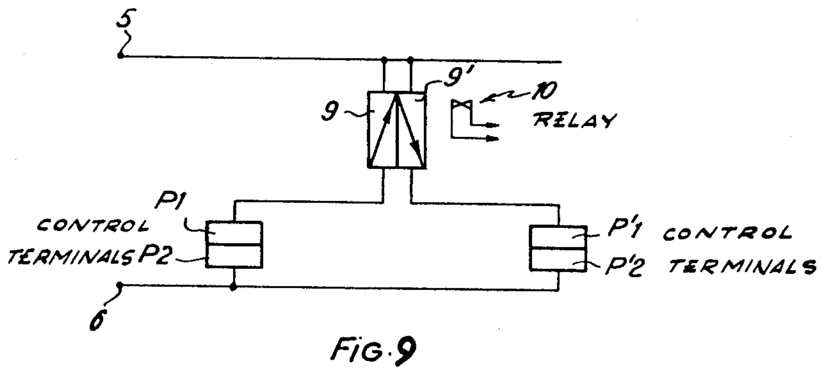
FIG. 9 is a diagram of the principle of an oscillating control circuit by means of two devices according to the invention.

In FIG. 9 there is shown an electrical installation of "the two way" type in which there exist two control points at a distance from each other and intended to control the same member, for example the supply of an electric lamp. In order to do this, two control devices according to the invention are used, for example of the type of FIG. 3, each being located at the chosen position. In FIG. 9 there is shown symbolically only the two control terminals P1 and P2, the winding 9 of the first control device, the two control terminals P'1, P'2 and the winding 9' of the second control device. According to the invention the two windings 9 and 9' are associated with a single contact 10 and are wound so as to produce an opposing flux. In this way, there is obtained a circuit whose logical function is of the EXCLUSIVE OR type with two inputs. The output signal (contact 10 open or closed) changes with each change of state of one or other control.

Figure 10A:
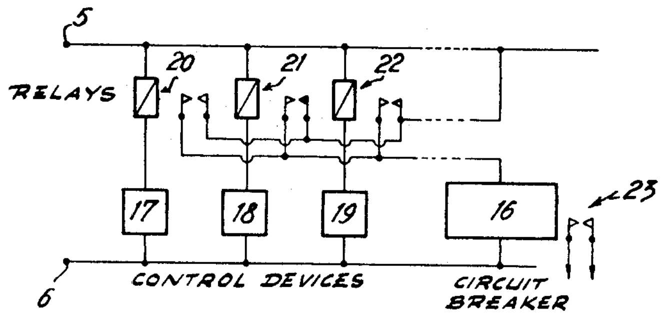
FIGS. 10A and 10B show two variations of the installation facilitating the control from a distance of a remote-control circuit-breaker from several locations, by means of the control devices of the invention.

In FIG. 10*a*, there is shown an installation which makes it possible to control a remote control circuit-breaker 16 from several control points. At each of these locations there is mounted a control device 17, 18, 19 according to the invention, associated with an electromagnetic relay 20, 21, 22, whose contacts for the control of the remote control circuit-breaker are connected in parallel. The remote control circuit-breaker 16 controls a contact 23.

Figure 10B:
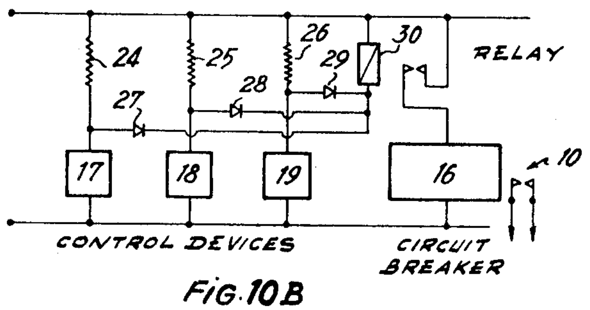

FIG. 10B illustrates a preferred variation of the installation for the control of the remote control circuit-breaker 16. In this case, the different relays associated with the devices 17 to 19 are replaced by resistances 24, 25, 26, at the terminals of which the control voltage is taken, through diodes 27, 28, 29 to control the supply of the coil of a single electromagnetic relay 30, controlling the supply of the remote control circuit-breaker. This assembly produces the NON-EXCLUSIVE OR logical function, which makes it possible to isolate each of the controls relative to the controlled part.

The applications of devices capable of such functions are very numerous. There may result an adaptation of these devices in certain special cases. This is why the present invention is in no way limited by the examples given, and extends to any variation within the reach of the man skilled in the art.

What is claimed is:

1. An electronic device intended to supply an electric control signal, in particular a signal of sufficient amplitude for controlling a relay, in response to the momentary application of an impedance which may be constituted by the impedance of the human body, between an input terminal for starting and earth, said device comprising a single active amplifier element, connected as a feedback oscillator having an open feedback circuit ending at the said input terminal for starting, the active element being biased in class C so that it is virtually blocked in the absence of oscillations when the feedback circuit is open, the application of the said impedance between the starting terminal and earth closing the feedback circuit such that the oscillator begins to oscillate and causes the active element to pass into a state of conduction, substantially into class A, the control signal being formed by the average current supplied by the active element, obtained by amplification of the component of direct current due to the detection of the oscillations on the input electrode of the active element, this single amplifier stage producing simultaneously a feedback of the high frequency current, a detection of the peaks of this high frequency current and an amplification in direct current of the detected current, this state of oscillation continuing or not, according to a chosen mode of operation after the said impedance is no longer applied.

2. A device according to claim 1 wherein the chosen mode of operation is such that the state of oscillation is maintained after the impedance is no longer applied, and wherein means is provided for short-circuiting the feedback to earth so as to stop the oscillations and return the active element to the blocked state.

3. A device according to claim 2, wherein the means for short-circuiting the feedback to earth comprise a second input terminal for stopping, connected to the feedback circuit such that the application of the said impedance between the stopping terminal and earth short-circuits the feedback to earth and, by stopping the oscillations, returns the active element to the blocked state.

4. A device according to claim 1, wherein the active element is a transistor, and the oscillator is of the tuned-base type, comprising an oscillatory circuit connected between the starting terminal and the base of the said transistor, and wherein a coil coupled to the said oscillatory circuit is connected in series in the collector circuit of the said transistor.

5. A device according to claim 1, comprising means for controlling the degree of feedback of the feedback circuit.

6. A device according to claim 4, including means for controlling the degree of feedback of the feedback circuit, said controlling means being means which varies the coupling of the oscillatory circuit and of the coil coupled to the said oscillatory circuit.

7. A device according to claim 6, in which the coupling between the coil of the oscillatory circuit and the coupled coil is realized by a variometer, the said variometer providing for a translation of one of the coils relative to the other.

8. A device according to claim 7, wherein the said variometer comprises an outer casing defining a square section and provided internally with a shoulder capable of immobilizing one of the coils, the two coils being wound on forms of a non-conducting material, one of which is provided with a central aperture and the other with a thread, so that the coil having a central aperture is the immobile coil, a plastic screw provided with a head passing through the said aperture of the immobile coil in order to engage in the thread of the other coil.

9. A device according to claim 4, including means for adjusting the degree of feedback of the feedback circuit, said controlling means being a variable resistance provided with the oscillatory circuit in order to modify its resistance.

10. A device according to claim 9 wherein said variable resistance is connected in parallel with said oscillatory circuit.

11. A device according to claim 9 wherein said variable resistance is connected in series between said oscillatory circuit and the input of the active amplifier element.

* * * * *